Inventor:
Theodore A. Rich,
by Merton D Moore
His Attorney.

United States Patent Office 2,719,258
Patented Sept. 27, 1955

2,719,258
FAST RESPONSE RECTIFIER CIRCUIT

Theodore A. Rich, Schenectady, N. Y., assignor to General Electric Company, a corporation of New York Application October 13, 1954, Serial No. 462,022

10 Claims. (Cl. 321—18)

This invention relates to a rectifier circuit, and more particularly to such a circuit as will rapidly follow the peak values of decreasing as well as increasing pulsating electrical energy.

It is frequently desired to convert A. C. to D. C. with a minimum of ripple or time delay, and many uses for a circuit accomplishing this can be found, especially where the A. C. has a low frequency. Such a circuit could be used in a peak voltmeter for measuring the peaks of A.-C. voltage. Also, this circuit could be used in a servo mechanism to avoid oscillations due to a time lag caused by the filtering in some rectifier circuits. Another use for such a circuit would be as an A.-C. voltage regulator for obtaining a direct current to be compared with a standard direct current. Such a regulator would be particularly useful on X-ray machines where the output is highly sensitive to the peak voltage. This circuit could also be used in a ratio meter, where it is desired to determine the ratio between the peaks of two input voltages.

One circuit which will follow the peaks of an A.-C. input is that of a rectifier in series with a capacitor, the A.-C. input being connected across the series arrangement. The voltage across the capacitor will rapidly attain the value of the peaks of the A.-C. injust as long as these peaks increase. However, when the peaks decrease, the capacitor tends to hold its charge. This defect, noted in connected with the rectifier-capacitor arrangement, is common to all of the circuits known to the art; namely, such circuits do not respond rapidly enough to decreasing as well as increasing electrical energy peaks. The present invention is designed to provide a rectifier circuit for use in any and all of the above-noted equipments and which will have a fast response to either increasing or decreasing alternating electrical energy peaks.

It is, therefore, one object of this invention to provide a rectifier circuit which will change A. C. to D. C. with a minimum time lag.

It is another object of this invention to provide a rectifier circuit for converting A. C. to D. C. with a minimum of ripple.

It is a further object of this invention to provide a rectifier circuit which will follow decreasing as well as increasing peaks of alternating electrical energy.

Other objects and advantages will appear as the description of the invention proceeds.

In accordance with the invention, a capacitor is charged to the peak value of a rectified A.-C. input, the capacitor following any increasing peaks with great rapidity. Connected to the capacitor is an electronic switch, such as a triode, which is receptive of the A.-C. input and biased in such a way that the switch can only operate during the peak value of the rectified A. C. The switch is so connected to the capacitor that it will become operative to couple the capacitor to the A.-C. input only when the peak rectified A. C. decreases in amplitude, the switch serving to drop the value of the capacitor quickly down to the value of the decreasing peak. The bias for the switch is obtained from phase shifting networks associated with the A.-C. input to the capacitor. By means of this invention, it is now possible to obtain a fast response rectifier circuit which will change A. C. to D. C. with a minimum time lag.

The features of this invention which are believed to be novel and patentable are pointed out in the claims which form a part of this specification. For a better understanding of the invention, reference is made in the following description to the accompanying drawings, wherein like parts are indicated by like reference numerals, in which:

Figure 1:
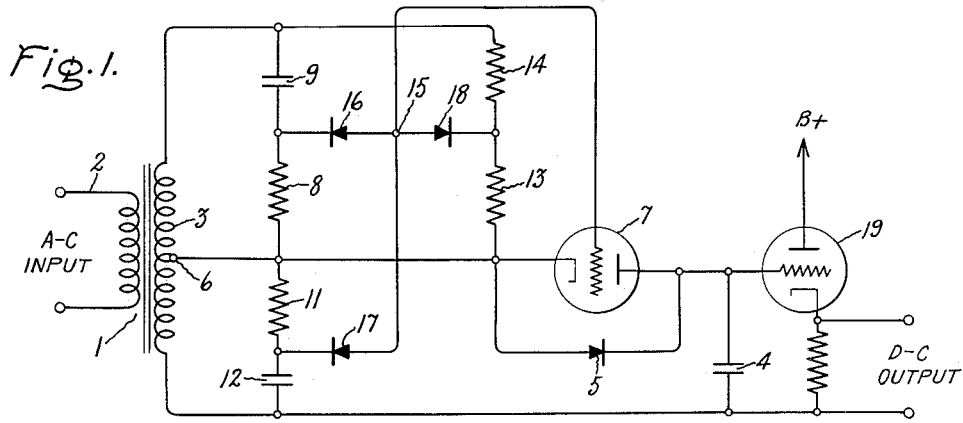
Fig. 1 is a circuit diagram of the invention.

Referring now to Fig. 1, there is shown a circuit for obtaining the above-noted advantages. In this figure is shown a transformer 1 having a primary winding 2 and a secondary winding 3. As indicated, an A.-C. input voltage is applied to the input terminals of primary winding 2, and it is this voltage that it is desired to rectify and transform into D. C. The top side of a capacitor 4 is connected through a rectifier 5 to a center tap 6 of secondary winding 3, the bottom side of capacitor 4 being connected to the bottom end of secondary winding 3. Connected in parallel with rectifier 5 is a switch tube 7, shown as a triode vacuum tube, the anode of this tube being connected to the top side of capacitor 4 and its cathode being connected to center tap 6. Connected across the top half of secondary winding 3 are a resistor 8 and a capacitor 9 connected in series, while a similar resistor 11 and a capacitor 12 are connected in series across the bottom half of secondary winding 3. Also connected across the top half of secondary winding 3 are a pair of series connected resistors 13 and 14. The control grid of switch tube 7 is connected to a point 15, at which point are also connected a rectifier 16 connected to the junction of resistor 8 and capacitor 9, a rectifier 17 connected to the junction of resistor 11 and capacitor 12, and a rectifier 18 connected to the junction of resistor 13 and 14. The D.-C. output from the entire circuit is taken across capacitor 4 by a cathode follower tube 19, this output appearing, as indicated, at the output terminals across the cathode resistor of the cathode follower. Rectifiers 16, 17 and 18 are connected with their polarities in such a way that they will pass only negative pulses to the grid of switch tube 7; and rectifier 5 is connected with its polarity such that it will only pass positive pulses to the top side of capacitor 4.

Figure 2:
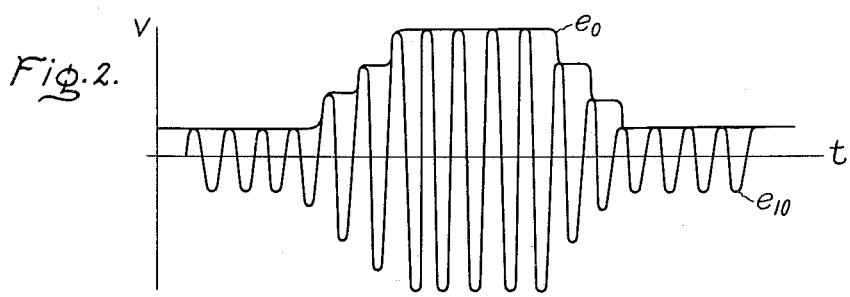
Fig. 2 is a diagram showing the voltage wave forms of the input to and output from the circuit of Fig. 1 plotted against time.

Referring now to Fig. 2 as well as Fig. 1, there is shown the input wave form applied between the bottom of capacitor 4 and center tap 6 of primary winding 2, this voltage being taken with the bottom of capacitor 4 as a reference point and being labelled $e_{10}$. Following the positive peaks $e_{10}$ is shown the output voltage taken from the output terminals of cathode follower 18 in Fig. 1, this voltage being labelled $e_0$. It will be seen that the output voltage follows the peaks of the input voltage with a minimum of delay, thus achieving the advantages noted above.

Now will be described the operation of the circuit shown in Fig. 1, Figs. 3 and 4 being used in connection with this description. Referring now specifically to Fig. 1, it will be seen that when the voltage at center tap 6 becomes positive relative to the bottom end of secondary winding 3, this positive pulse will be transmitted through rectifier 5, due to its polarity, to the top of capacitor 4. Capacitor 4 will therefore immediately become positively charged and will remain so since there is no discharge path for this capacitor. If the next positive pulse exceeds the first positive pulse in amplitude, capacitor 4 will immediately become charged to the amplitude of this next positive pulse. However, if any succeeding positive pulse after the first one decreases in amplitude, switch tube 7 will conduct and immediately couple capacitor 4 to the voltage source and permit it to drop down to the new peak value of that positive pulse. The conduction of tube 7 becomes possible due to the fact that the anode of this tube is at the same potential as capacitor 4, while the cathode of this tube is at the new, lower value of peak voltage. With a higher positive potential on its anode than on its cathode, switch tube 7 will conduct and discharge capacitor 4. When a positive pulse is equal to or greater than a preceding pulse, this tube cannot conduct since its anode potential is equal to or less than its cathode potential.

Figure 3:
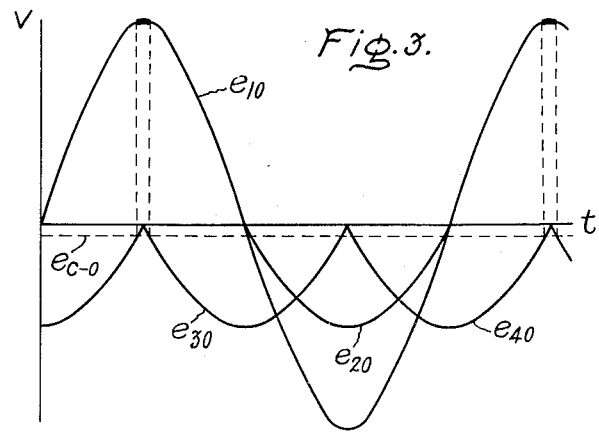
Fig. 3 is a diagram showing the wave forms of voltages at various points in the circuit of Fig. 1 plotted against time.
Figure 4:
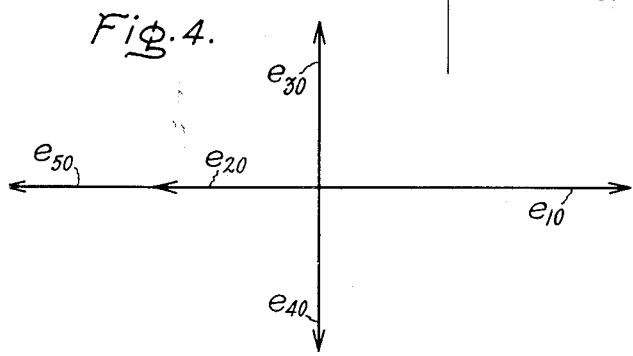
Fig. 4 is a diagram showing the wave forms of Fig. 3 in vector form.

Reference is now made to Figs. 3 and 4. In order to ensure the nonconduction of switch tube 7 during the negative peaks of the input potential, a bias potential for the grid of this tube is needed to prevent this tube from conducting for any portion of the cycle of the input voltage except the positive peak portions. This bias potential is applied between the cathode and the control grid of switch tube 7 from point 15 through rectifiers 16, 17 and 18. A portion of the required bias potential is obtained from resistor 11 and capacitor 12 which provide a voltage $e_{30}$ which leads the voltage across the bottom half of secondary winding 3 by substantially 90°. A voltage $e_{40}$ that leads by substantially 90° the voltage across the top half of secondary winding 3 is obtained from the network comprised of resistor 8 and capacitor 9. A voltage $e_{20}$ is obtained from resistor network 13 and 14, this voltage being 180° out of phase with the voltage $e_{10}$ across the bottom half of the secondary winding 3. Rectifiers 16, 17 and 18 transmit only the negative half of bias voltages $e_{20}$, $e_{30}$ and $e_{40}$ to the grid of switch tube 7.

It is believed that a reference to Fig. 4 will make clear the above relationships. This figure shows five voltage vectors, all taken with respect to the cathode of tube 7. In this figure, $e_{10}$ is shown as being 180° out of phase with $e_{20}$, whereas in Fig. 3 they are shown as being in phase. This is due to the fact that in Fig. 3, $e_{10}$ is taken with reference to the bottom of secondary winding 3 from the center tap 6, whereas in Fig. 4 it is taken with reference to the center tap from the bottom of the secondary winding. Vectors $e_{30}$ and $e_{40}$ are shown 180° out of phase with one another and 90° out of phase with $e_{20}$, $e_{20}$ being 180° out of phase with the vector $e_{10}$, which is the voltage across the bottom half of secondary winding 3. Voltage $e_{20}$ is in phase with $e_{50}$, the voltage across the top half of secondary winding 3.

Referring now to Fig. 3, it will be seen that the three voltages $e_{20}$, $e_{30}$, and $e_{40}$ are connected through rectifiers 16, 17, 18 to point 15. Point 15 then is always equal to the maximum negative voltage of either $e_{20}$, $e_{30}$ or $e_{40}$ and it can be seen that the potential at point 15 is sufficient to cut off tube 7 at all times except during the positive peak of $e_{10}$. These bias voltages therefore prevent switch tube 7 from conducting except during these positive peak portions; even then this tube can only conduct when the positive pulse applied to its cathode is less than the positive pulse that preceded it, as noted above. It should be understood that because of the presence of resistors 8 and 11, vectors $e_{30}$ and $e_{40}$ are only approximately 90° out of phase with vector $e_{20}$ and that an increase in the value of these resistors will vary the out of phase angle of these vectors and increase the peak conduction period of waveform $e_{10}$ in Fig. 3.

In the circuit that was actually built and tested, capacitor 4 had a value of 0.1 $\mu$f., and capacitors 9 and 12 had values of 0.25 $\mu$f.; resistors 8, 11 and 13 had values of 1000 ohms each, and resistor 14 and the cathode resistor of tube 18 had values of 10,000 ohms each; the voltage from the center tap 6 of secondary winding 3 with respect to either the top or bottom ends of this winding went from zero to 150 volts peak value, while the anode of cathode follower tube 18 went to a 200 volt D.-C. power supply. With this circuit, a D.-C. output was obtained which responded within one cycle to the A.-C. input. From these test results, it is believed apparent that the circuit disclosed provides A.-C. to D.-C. rectification with a minimum ripple and time lag, following decreasing as well as increasing A.-C. voltages.

It should be understood that this invention is not limited to any special form of phase shifting network for deriving suitable bias potential for switch tube 7, since it is well known that, for example, inductors could be used to provide phase shifts suitable for use in this invention. Moreover, this invention is not limited to the use of any particular switch tube 7 since a biased diode could be used to replace the triode shown in Fig. 1; or for any matter any type of electronic switch tube could be used to replace switch tube 7. Also, it should be understood that the circuit of this invention could be used with an input of only positive pulses; and, therefore, voltage $e_{20}$ would not be required and resistors 13 and 14 would not be necessary. Finally, it should be clear that cathode follower 19 is merely a convenient device for deriving the output from capacitor 4 and is not necessary to the invention.

While there has been described what is at present considered a preferred embodiment of the invention, it will be obvious to those skilled in the art that various changes and modifications may be made therein without departing from the invention, and it is aimed by the appended claims to cover all such changes and modifications as fall within the true spirit and scope of the invention.

What I claim as new and desire to secure by Letters Patent of the United States is:

1. A fast response rectifier circuit comprising, storage means receptive of pulsating electrical energy for storing the peak values of said energy, and electronic switch means receptive of said pulsating electrical energy and providing a connecting path between said pulsating electrical energy and said storage means only during the peak values of said pulsating electrical energy and only when these peak values decrease to a value less than the value of the electrical energy stored in said storage means.

2. A fast response rectifier circuit comprising, storage means receptive of pulsating electrical energy for storing the peak values of said energy, and normally open electronic switch means respective of said pulsating electrical energy and providing a connecting path between said pulsating electrical energy and said storage means when it is closed, said electronic switch means being closed only during the peak values of said pulsating electrical energy and only when these peak values decrease to a value less than the value of the electrical energy stored in said storage means.

3. A fast response rectifier circuit comprising, electrical energy storage means, rectifier means coupled to said storage means and receptive of pulsating electrical energy for unidirectionally passing said electrical energy to said storage means, said storage means storing the peak values of said energy, and electronic switch means coupled to said storage means and receptive of said pulsating electrical energy for providing a connecting path between said pulsating electrical energy and said storage means only during the peak values of said pulsating electrical energy and only when these peak values decrease to less than the value of the electrical energy stored in said storage means.

4. A fast rectifier circuit comprising, electrical energy storage means, rectifier means receptive of a pulsating voltage and coupled to said storage means with a polarity such that only a portion of said pulsating voltage having a given polarity can pass therethrough to said storage means, said storage means storing the peak values of said pulsating voltage and unidirectional electronic switch means coupled to said storage means and receptive of said pulsating voltage for providing a connecting path between said voltage and said storage means only during the peak values of said given polarity of the voltage that is applied to it and only when these peak values are less than the value of the voltage stored in said storage means.

5. A fast response rectifier circuit comprising, storage means receptive of pulsating electrical energy for storing the peak values of said energy, electronic switch means receptive of said pulsating electrical energy and providing a connecting path between said pulsating electrical energy and said storage means when it is closed, and bias means for preventing said switch means from closing except when said electrical energy is substantially near its peak, said electronic switch means being closed only when the peak values of the pulsating electrical energy that is applied to it decrease to less than the value of the electrical energy stored in said storage means.

6. A fast response rectifier circuit comprising, electrical energy storage means, rectifier means coupled to said storage means and receptive of pulsating electrical energy for unidirectionally passing said electrical energy to said storage means, said storage means storing the peak values of said energy, electronic switch means coupled to said storage means and receptive of said pulsating electrical energy for providing a connecting path between said pulsating electrical energy and said storage means when it is closed, and bias means for preventing said switch means from closing except when said pulsating electrical energy is substantially near its peak, said electronic switch means being closed only when the peak values of said pulsating electrical energy that is applied to it are less than the value of the electrical energy stored in said storage means.

7. A fast response rectifier circuit comprising, voltage storage means, rectifier means receptive of a pulsating voltage and coupled to said storage means with a polarity such that only a portion of said pulsating voltage having a given polarity passes therethrough to said storage means, said storage means storing the peak values of the given polarity of said voltage, unidirectional electronic switch means coupled to said rectifier means with a polarity opposite to that of said rectifier means and receptive of said pulsating voltage for providing a connecting path between said pulsating voltage and said storage means when it is closed, and bias means for preventing said switch means from closing except when said pulsating voltage is substantially near one of its peaks of said given polarity, said electronic switch means being closed only when the peak values of said given polarity of said pulsating voltage are less than the value of the voltage stored in said storage means.

8. A fast response rectifier circuit comprising, storage means receptive of pulsating electrical energy for storing the peak values of said energy, electronic switch means receptive of said pulsating electrical energy and providing a connecting path between said pulsating electrical energy and said storage means when it is closed, and bias means for deriving and applying to said switch means three alternating bias voltages, one bias voltage being substantially 180° out of phase with said pulsating electrical energy and the other two respectively being plus and minus substantially 90° out of phase with said pulsating electrical energy, to prevent said switch means from closing except when said pulsating electrical energy is substantially near its peak, said electronic switch means being closed only when the peak values of said pulsating electrical energy are less than the value of the electrical energy stored in said storage means.

9. A fast response rectifier circuit comprising, voltage storage means, transformer means receptive of a pulsating voltage and coupled to one end of said storage means, electronic switch means coupled between the other end of said storage means and said transformer means for coupling said voltage from said transformer means to said storage means when it is closed, rectifier means connected across said switch means with a polarity such that only a portion of said pulsating voltage having a given polarity can pass therethrough to said storage means, first phase shifting means coupled to said transformer means for providing a first bias voltage that leads by substantially 90° the pulsating voltage coupled to said storage means, second phase shifting means coupled to said transformer means for providing a second bias voltage that lags by substantially 90° the pulsating voltage coupled to said storage means, means coupled to said transformer means for providing a third bias voltage that is substantially 180° out of phase with the pulsating voltage coupled to said storage means, and means for applying said first, second, and third bias voltages to said switch means to maintain it open except during the peaks of said given polarity of said pulsating voltage said switch means being closed only when said peaks have values less than the value of the voltage stored in said storage means.

10. A fast response rectifier circuit comprising, capacitor means for storing voltage pulses, transformer means having a primary winding receptive of a pulsating voltage and a secondary winding having one end coupled to one end of said capacitor means, triode electronic switch means having an anode connected to the other end of said capacitor means and a cathode connected to a point between the ends of said secondary winding of said transformer means, rectifier means connected across said triode means with a polarity such that only positive voltage pulses can pass therethrough to said capacitor means, capacitor-resistor phase shifting means coupled between said cathode and said one end of the secondary winding of said transformer means for providing a first voltage that leads by substantially 90° the voltage across a first portion of the secondary winding, capacitor-resistor phase shifting means coupled between said cathode and the other end of the secondary winding of said transformer means for providing a second voltage that leads by substantially 90° the voltage across a second portion of the secondary winding resistor means connected between said cathode and the other end of said secondary winding of said transformer means for providing a third voltage that is substantially 180° out of phase with the voltage in said first portion of said secondary winding, and first, second and third rectifier means for respectively applying only the negative portions of said first, second and third voltages to the control grid of said triode means so that said triode means can conduct only during the positive peaks of the pulsating applied to its cathode, said triode means conducting only when said peaks have a value that is less than the value of the voltage stored in said capacitor means.

No references cited.